(12) United States Patent
Orbock

(10) Patent No.: US 6,188,433 B1
(45) Date of Patent: Feb. 13, 2001

(54) METHOD AND APPARATUS FOR ENHANCING THE DYNAMIC RANGE OF A CCD SENSOR

(75) Inventor: Jeffrey D. Orbock, Louisville, CO (US)

(73) Assignee: Ball Aerospace & Technologies Corp., Boulder, CO (US)

( * ) Notice: Under 35 U.S.C. 154(b), the term of this patent shall be extended for 0 days.

(21) Appl. No.: 09/241,981

(22) Filed: Feb. 2, 1999

(51) Int. Cl.$^7$ ........................................... H04N 3/14
(52) U.S. Cl. ............................... 348/297; 348/217
(58) Field of Search .................... 348/297, 298, 348/362, 229, 221, 294, 255, 364, 365, 356, 308, 309, 363, 217, 299; 257/230, 229; 250/208.1

(56) References Cited

U.S. PATENT DOCUMENTS

| | | |
|---|---|---|
| 3,931,465 | 1/1976 | Levine . |
| 3,953,733 | 4/1976 | Levine . |
| 4,050,085 * | 9/1977 | Prince et al. ................. 348/217 |
| 4,188,642 | 2/1980 | Morishita et al. . |
| 4,489,423 | 12/1984 | Suzuki . |
| 4,581,648 * | 4/1986 | Ganther ...................... 348/217 |
| 4,598,414 | 7/1986 | Dries et al. . |
| 4,626,915 * | 12/1986 | Takatsu ...................... 348/299 |
| 4,673,963 | 6/1987 | Hynecek . |
| 4,758,741 | 7/1988 | Arques . |
| 4,851,914 * | 7/1989 | Pfanhouser et al. .......... 348/217 |
| 4,872,057 * | 10/1989 | Woolfolk ..................... 348/217 |
| 4,918,534 * | 4/1990 | Lam et al. ................... 348/217 |
| 5,182,647 | 1/1993 | Chang . |
| 5,306,931 | 4/1994 | Stevens . |
| 5,341,219 * | 8/1994 | Schelen et al. ............... 348/217 |
| 5,420,635 * | 5/1995 | Konishi et al. ............... 348/362 |
| 5,422,669 | 6/1995 | Mori . |
| 5,488,010 | 1/1996 | Wong . |
| 5,519,204 | 5/1996 | Rudd et al. . |
| 5,587,596 | 12/1996 | Chi et al. . |
| 5,589,880 * | 12/1996 | Tsukui ........................ 348/229 |
| 5,602,407 * | 2/1997 | Washkurak et al. ........... 257/229 |
| 5,696,393 | 12/1997 | Blaszczynski . |
| 5,872,595 * | 2/1999 | Monahan ..................... 348/217 |
| 6,008,486 * | 12/1999 | Stam et al. .................. 250/208.1 |
| 6,040,570 * | 3/2000 | Levine et al. ................ 250/208.1 |

* cited by examiner

Primary Examiner—Wendy Garber
Assistant Examiner—Aung S. Moe
(74) Attorney, Agent, or Firm—Sheridan Ross P.C.

(57) ABSTRACT

An imaging system having a CCD sensor varies the intensity of an input image presented to the sensor during an integration period of the sensor to enhance the intra-scene dynamic range of the imaging system. The sensor well depth of the CCD sensor is also varied during the integration period in a manner that complements the intensity variation to achieve the dynamic range improvement. In one approach, the intensity of the input image is progressively decreased during the integration period while the sensor well depth is correspondingly increased. In another approach, an intensifier unit is gated off during the integration period to provide the intensity variation. A closed loop control method is provided for controlling the image intensity and/or the well depth based upon the content of the present image.

8 Claims, 10 Drawing Sheets

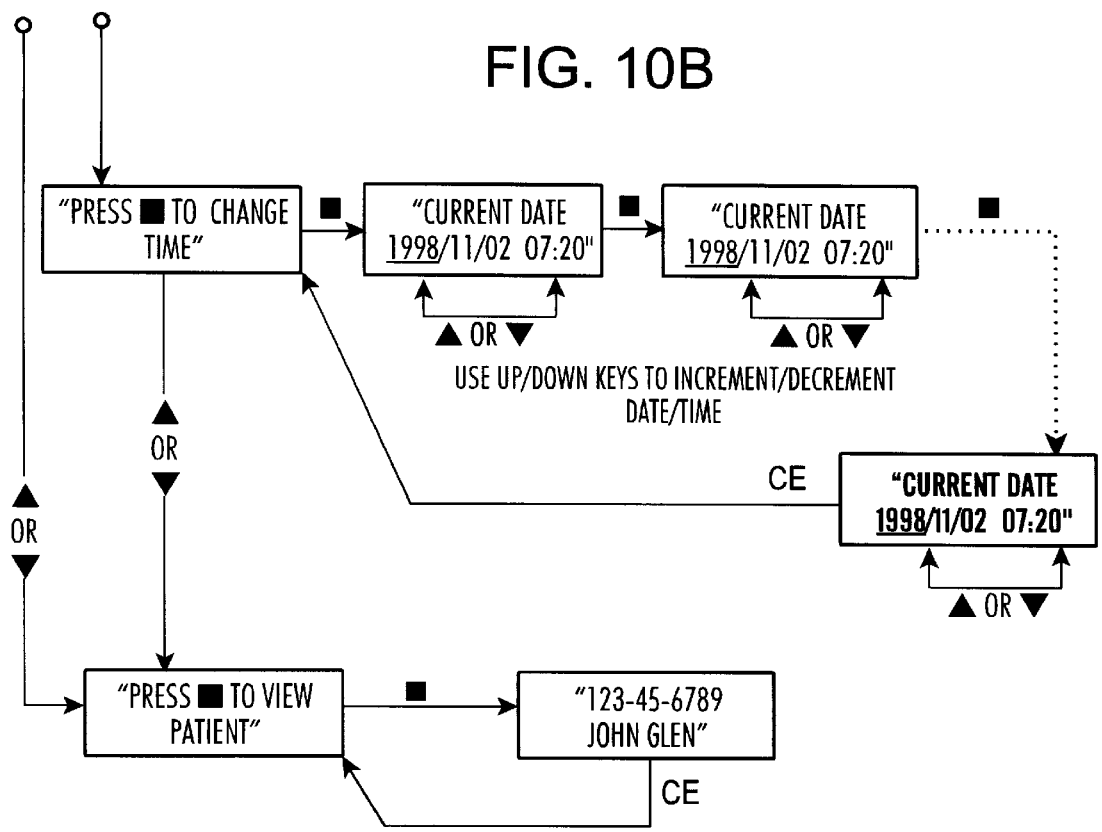

METHOD AND APPARATUS FOR ENHANCING THE DYNAMIC RANGE OF A CCD SENSOR

FIELD OF THE INVENTION

The invention relates generally to charge coupled devices (CCDs) and, more specifically, to methods for increasing the dynamic range of CCDs.

BACKGROUND OF THE INVENTION

Sensor-based, electro-optical systems have historically been limited in their ability -to image a wide range of illumination levels within a single integrated scene. This limitation n intra-scene dynamic range is emphasized in systems applied in low light level applications where the scene illumination can be as high as 1,000,000 to 1. Standard video rate image sensors are limited in dynamic range and therefore are only able to discern a limited portion of the total scene content. This lack of adequate dynamic range is particularly noticeable in video imaging systems employing image intensifiers where the brightness of large diameter transparent halos around point sources of light exceed the intra-scene dynamic range capability of standard sensor technology.

Therefore, there is a need for a method and apparatus for increasing the dynamic range of sensor based imagers.

SUMMARY OF THE INVENTION

The present invention relates to an imaging system that is capable of achieving a relatively high intra-scene dynamic range using a charge-coupled device (CCD) sensor. The imaging system includes functionality for controlling the intensity of the image reaching the CCD sensor during the CCD integration period in a manner that enhances the dynamic range of the imaging system. The image intensity is varied in a complementary manner with the charge well depth of the CCD sensor during the integration period to achieve the dynamic range improvement. The inventive principles are suitable for use in any imaging system that uses CCDs or similar sensing devices. The invention is particularly advantageous in systems for use in low-light conditions, such as those using intensifiers to increase the intensity of visual images to better discern faint objects/scenes.

BRIEF DESCRIPTION OF THE DRAWINGS

FIGS. 11–16 are timing diagrams illustrating various control techniques for use in accordance with the present invention; and FIG. 17 is a timing diagram illustrating another control technique for use in accordance with the present invention.

DETAILED DESCRIPTION

Figure 1:
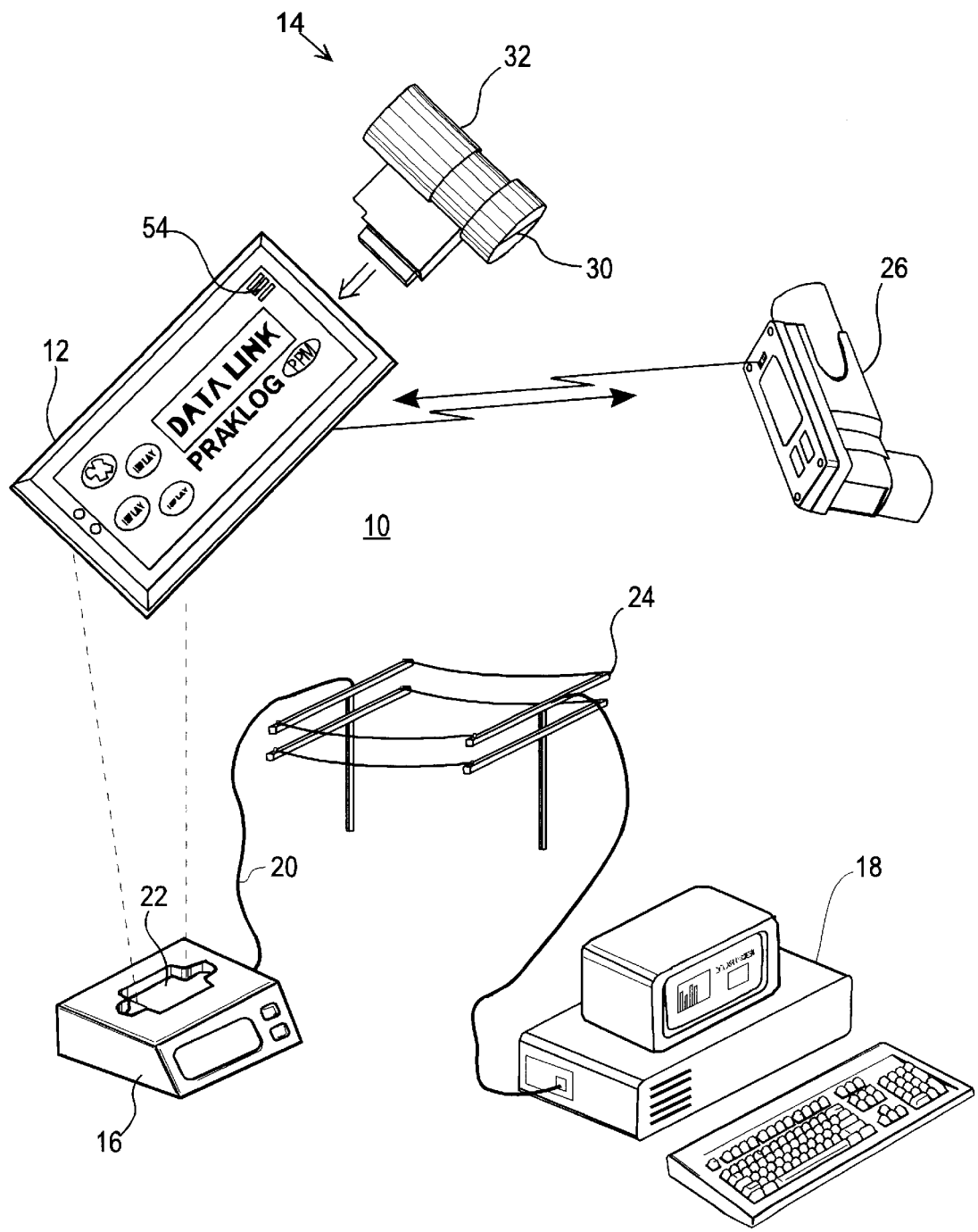
FIG. 1 is a block diagram illustrating a system that can be modified in accordance with the present invention.

FIG. 1 is a block diagram illustrating a typical sensor-based imager 10 that can be modified in accordance with the principles of the present invention. The sensor-based imager 10 is operative for converting an external visual image into an electrical representation that can be stored and/or delivered to a display device for viewing. As illustrated, the imager 10 includes: an image input device 12, an intensifier 14, a sensor 16, a pre-amplifier 18, and a storage/display unit 20. The image input device 12 receives a visual image 22 from an exterior environment and transfers it to the intensifier 14. The intensifier 14 increases the intensity of the visual image and then transfers the intensity modified image 24 to the sensor 16. The sensor 16 senses the intensity modified image 24 and converts it to an electrical signal 26 that is transferred to the pre-amplifier 18. The pre-amplifier 18 amplifies the electrical signal 26 and transfers the amplified electrical signal 28 to the storage/display unit 20 for storage and/or display. Although not shown, an analog-to-digital converter (ADC) may be used in the output chain of the sensor 16 to convert the analog output of the sensor 16 to a digital format.

The image input device 12 can include any structure that is capable of receiving an image from an exterior environment and transferring the image to appropriate functionality within the imager 10 (e.g., the intensifier 14). In a preferred embodiment, the image input device 12 includes a standard lens that is used to focus an input image on an operative portion of the intensifier 14. In a more sophisticated system, the image input device 12 can include a bundle of optical fibers for carrying the input image to the intensifier 14 or another device. In a less sophisticated system, the input device 12 can be as simple as an aperture in a housing of the imager 10. As will be apparent to persons of ordinary skill in the art, a wide range of different image input arrangements are possible.

The pre-amplifier 18 can include virtually any device for boosting the magnitude of the electrical signal generated by the sensor 16 by an appropriate amount. Preferably, the pre-amplifier 18 will be a relatively low-noise device. The storage/display 20 represents the destination of the electrical image signal generated by the imager 10. That is, the image signal can be stored for later viewing or it can be immediately delivered to a monitor (or other display device) for display to a user. As can be appreciated, a large variety of different displays and/or signal storage means can be used.

Figure 2:
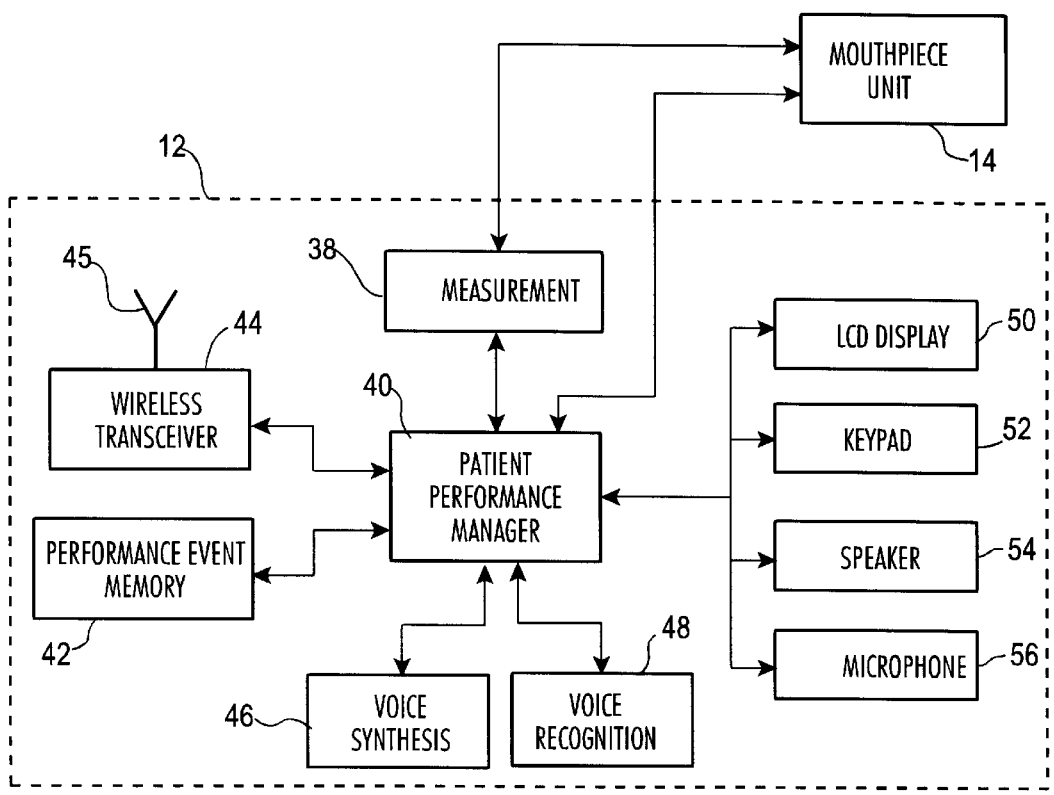
FIG. 2 is a sectional view illustrating an intensifier that can be used in accordance with the present invention.

The intensifier 14 is a device for increasing the intensity of a visual image received from the exterior environment. As discussed above, intensifiers are generally employed in low light applications where faint intensity differences in a scene make it difficult to discern objects. FIG. 2 is a diagram illustrating the structure of a typical intensifier unit 14. As illustrated, the intensifier 14 includes a photo-cathode 30, a micro-channel plate 32, and an anode 34. A negative voltage is applied to the photo-cathode 30 and a positive voltage is applied to the anode 34, forming an electric field in the region between the cathode 30 and the anode 34. During operation of the intensifier 14, an input image 22 is incident upon the photo-cathode 30 which causes electrons to be emitted by the photo-cathode 30. The number of electrons emitted by a particular portion of the photo-cathode 30 is substantially proportional to the intensity of light striking that portion. That is, portions of the photo-cathode 30 corresponding to brighter parts of the input image will emit more electrons and portions corresponding to dimmer parts of the image will emit less electrons. The emitted electrons are carried by the electric field to an input edge of the micro-channel plate 32.

The micro-channel plate 32 is a porous structure having a multitude of small channels for use in directing electrons from the photo-cathode 30 to the anode 34. The channels of the micro-channel plate 32 are typically so small that a plurality of channels are required to generate a single pixel of the output image of the imager 10. After the electrons have been received at the input edge of the micro-channel plate 32, they travel down the respective channels of the plate 32 toward the anode 34 under the influence of the electric field. While traveling, the electrons cause additional electrons to be generated in the micro-channel plate 32 so that, by the time the electrons reach the anode 34, their numbers have been increased substantially. The amount by which the number of electrons increases (and, therefore, the gain of the intensifier 14) depends upon a level of voltage applied to the micro-channel plate 32.

The anode 34 is a phosphor device that generates light in response to being bombarded by electrons. The intensity of the generated light is substantially proportional to the number of electrons striking the anode 34 at a particular time. Therefore, the image 24 which is output by the anode 34 is basically an intensified version of the input image 22.

In addition to the above elements, some intensifiers also include a gating structure that allows the propagation of image information through the intensifier to be ceased by delivery of an appropriate control signal to the intensifier. Gating can also be accomplished by, for example, appropriately controlling the voltage applied to the micro-channel plate 32 or other structures within the intensifier. It should be appreciated that intensifier configurations other than that illustrated in FIG. 2 can also be used in accordance with the present invention.

A problem with intensifiers of the type illustrated in FIG. 2 is that they often produce a "halo" effect when concentrated point sources of light exist within an otherwise dimly lit scene. That is, the sensed image will show a bright "aura" around the point source that is not part of the actual visible scene. The halo is generally the result of an electron scattering effect within the intensifier. In many cases, the halo is intense enough to saturate the sensor 16, thereby masking any detail that would otherwise be visible within the halo area. In accordance with the present invention, dynamic range can be improved to a level that allows the detail that is normally lost within the halo to be visible within the sensed image. That is, a viewer of the processed image will be able to "see through" the halo to discern objects that would normally be masked.

The sensor 16 is a charge coupled device (CCD) sensor or similar device. A typical CCD sensor generally comprises an array of metal oxide semiconductor (MOS) capacitors that are arranged in a two dimensional fashion upon a semiconductor substrate. An input visual image that is to be recorded or displayed is projected upon the MOS array and the sensor converts the visual image to an electrical representation of the image. Each of the MOS capacitors corresponds to a single pixel in the resulting electrical representation. The MOS capacitors each function as charge collection devices that collect charge in response to the visual image that is incident upon the sensor. The more intense the visual image is on the portion of the sensor having a particular MOS capacitor, the more charge is accumulated in that MOS capacitor. Therefore, bright areas of a scene will include MOS capacitors that have a large amount of stored charge and dim areas of a scene will have MOS capacitors that have a relatively small amount of stored charge. The charge stored in the MOS capacitors for a particular scene is transferred out of the sensor and is normally converted to a digital signal that is representative of the scene. The digital signal can then be stored or delivered to an appropriate display device for viewing.

Figure 3:
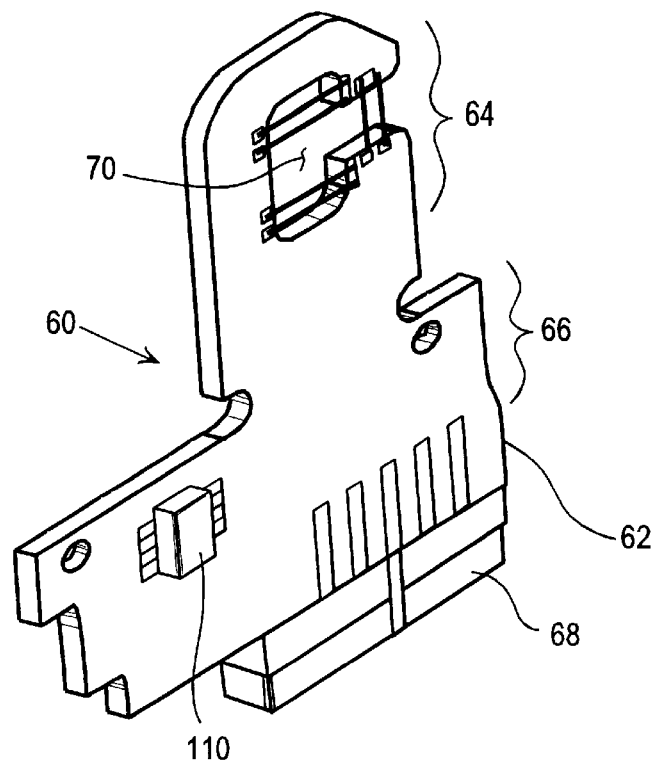
FIG. 3 is a sectional side view of a metal-oxide-semiconductor (MOS) capacitor that can be used in a charge-coupled device (CCD) sensor.

FIG. 3 is a cross-sectional view of a single MOS capacitor 40 that can be used in a CCD sensor. It should be appreciated that a typical sensor will include a multitude of these MOS capacitors arranged in a two-dimensional pattern on the surface of a substrate. As illustrated the MOS capacitor 40 includes a semiconductor substrate 42, an insulator layer 44, and an electrode 46, sometimes called a gate. The substrate 42 is doped with a p-type dopant to produce a situation where positive majority carriers are prevalent in the substrate 42. When a positive potential is applied to the electrode 46, the positive carriers in the substrate 42 just below the electrode 46 are repelled resulting in a depletion region 48 in the substrate 42. After the depletion region 48 has been created, any minority carriers (i.e., electrons) that make their way into the depletion region 48 collect at the upper surface of the substrate just below the electrode 46. For example, FIG. 3 illustrates the collection of electrons 50 in the upper portion of the depletion region 48. Normally, with no external stimuli, minority carriers will only collect in the depletion region 48 as a result of thermal generation, a relatively slow process. However, if light is projected onto the substrate 42 while the depletion region exists, optical carrier generation occurs and minority carriers are generated at an accelerated rate. This is the principle that allows visual images to be converted to electrical signals.

During a typical operational cycle, an image is projected onto the two dimensional array of MOS capacitors and each of the capacitors generates an amount of charge that corresponds to the intensity of the portion of the image that falls on that capacitor. The charge "packets" are then shifted out of the sensor in an appropriate order and the resulting electrical signal is digitized. The digital signal can then be transferred to a display for viewing or to an appropriate digital storage unit for storage. In video applications, individual scenes are recorded at a relatively high rate so that there is inter-scene continuity when the scenes are displayed in progression on a monitor. That is, the process of charge accumulation and charge shifting is a continuous repetitive process. The period during which charge is allowed to accumulate under the electrode 46 is generally known as the integration period. The duration of the integration period will generally depend, in part, upon the frequency with which individual images need to be recorded to support, for example, video applications.

Figure 4:
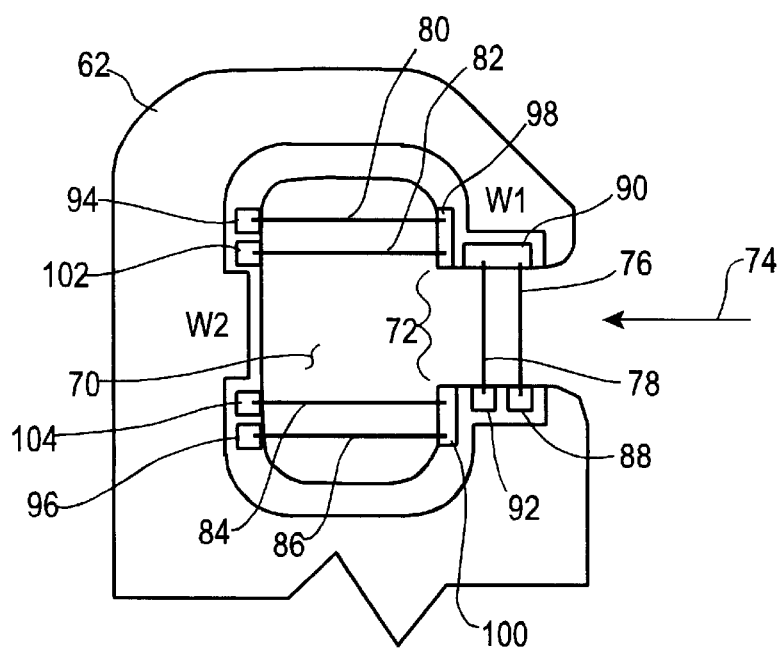
FIGS. 4, 5, and 6 are diagrams illustrating charge wells having varying well depths.
Figure 5:
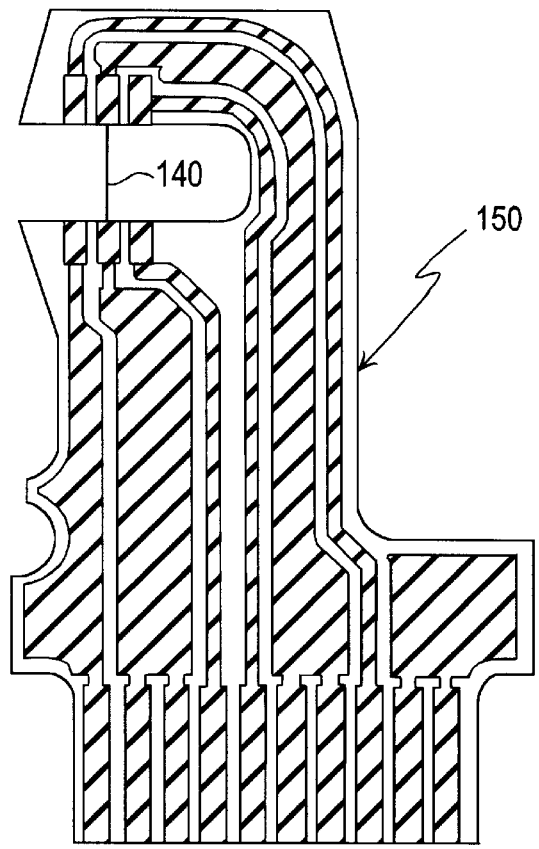
Figure 6:
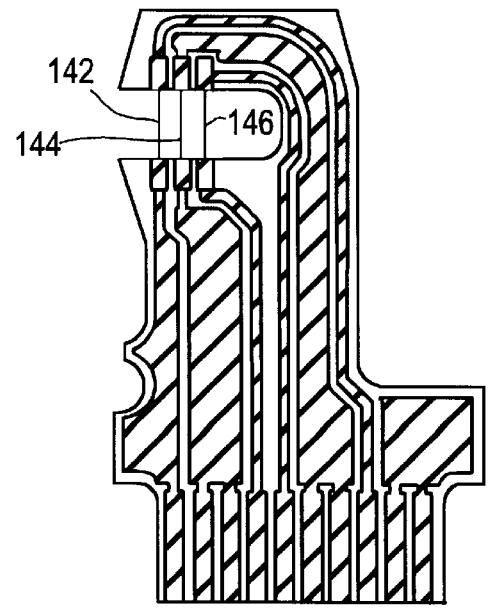

The depletion region 48 illustrated in FIG. 3 can be thought of as a "charge well" that is capable of storing up to a maximum amount of charge. Once that maximum amount of charge has been reached in a charge well, any additional charge added to the well will spill over into an adjacent overflow drain structure. As illustrated in FIGS. 4–6, the capacity of a charge well is dictated by its well depth. That is, the deeper well of FIG. 6 is capable of storing a much larger amount of charge than the shallower well of FIG. 4. In general, the well depth of a MOS capacitor 40 can be varied by varying the potential applied to the electrode 46.

The "dynamic range" of a system is a specification that measures the overall range of some parameter that can be adequately handled by the system. For example, intra-scene dynamic range in imaging applications measures the range of image intensities in an input image that can be accurately reproduced by an imaging system. Some factors which affect the dynamic range in an imaging system using CCDs are the charge capacity of the wells within the sensor and the inherent noise of the system. -It is known that the intra-scene dynamic range of a CCD-based imaging system can be improved by varying the well depth of the individual charge wells within the CCD sensor during the integration period in an appropriate manner. In conceiving the present invention, it was discovered that further enhancement of intra-scene dynamic range can be achieved by also controlling the intensity of the input image during the integration period of the sensor. That is, by appropriately controlling both the well depth of the charge wells and the input image intensity during the integration period, significant gains in dynamic range can be achieved. Use of image intensity variation provides an added layer of control that allows, for example, very bright portions of a scene to be recorded without saturation of the corresponding charge well. This allows a wider range of signals to be effectively recorded and reduces the occurrence of blooming and other saturation effects.

In accordance with the present invention, it was determined that enhanced dynamic range is achieved by reducing the intensity of the input image with time during the integration period. This reduction in intensity occurs while the well depths of the charge wells in the sensor 16 are increasing. Reduction in the intensity of the input image reduces the rate with which charge is accumulated in the charge wells. This, in turn, reduces the chances that saturation will occur in the sensor 16 and effectively increases the maximum intensity within a scene that can be accurately recorded by the system without increasing the minimum intensity capable of being sensed. By increasing the maximum intensity without increasing the minimum intensity, increased dynamic range is achieved. By combining the effect of the intensity reduction with an increase in well depth, a significant enhancement in dynamic range is achieved.

Figure 7:
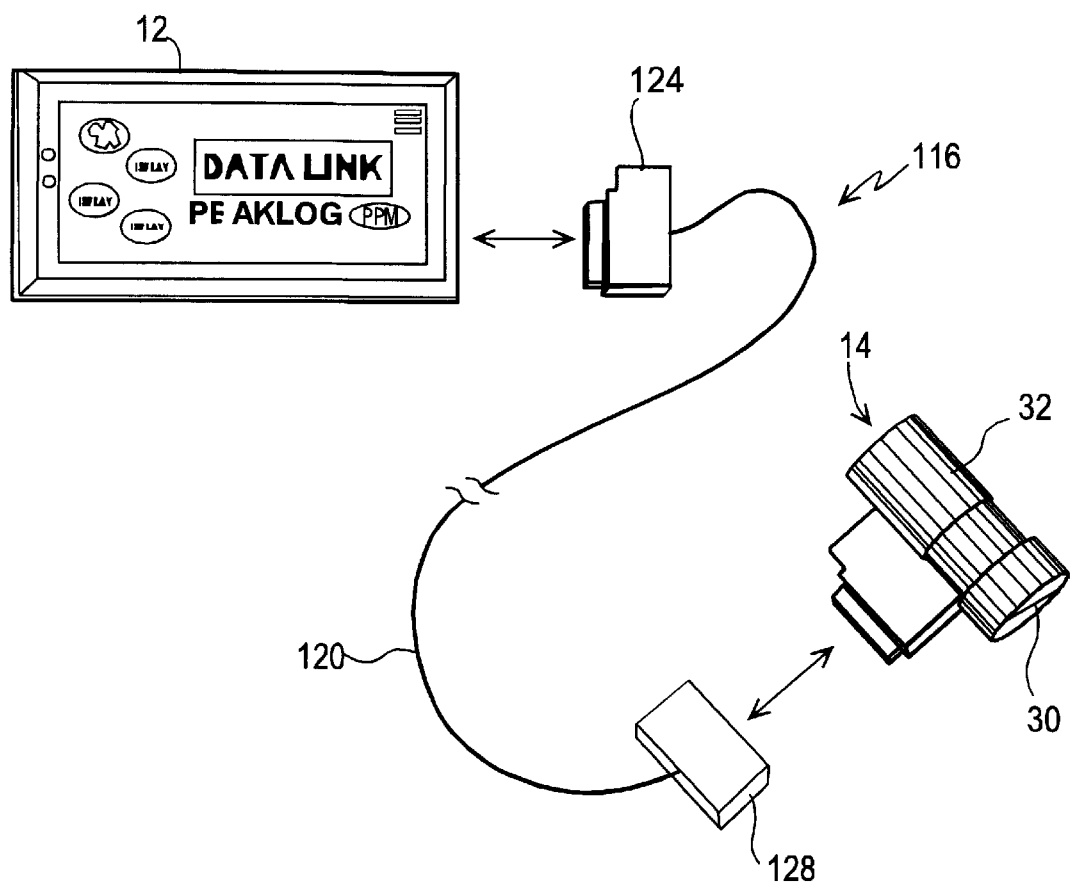
FIGS. 7, 8, and 9 are block diagrams illustrating imaging systems in accordance with various embodiments of the present invention.

FIG. 7 is a block diagram illustrating a system 60 in accordance with one embodiment of the present invention. For convenience, the same reference numerals will be used throughout the figures to describe similar functionality. As shown in FIG. 7, a controller 62 is coupled to the intensifier 14 and the sensor 16 for use in controlling the input image intensity and the well depth of the charge wells during the integration period. To control the input image intensity, the controller 62 varies the gain of the intensifier 14 by controlling, for example, the voltage applied to the microchannel plate 32 of the intensifier 14. To control the well depth, the controller 62 varies the voltage applied to the electrodes 46 of the MOS capacitors 40 in the sensor 16. As will be described in greater detail, the system 60 can also include a closed control loop 64 for making control decisions based on scene content.

Figure 11:
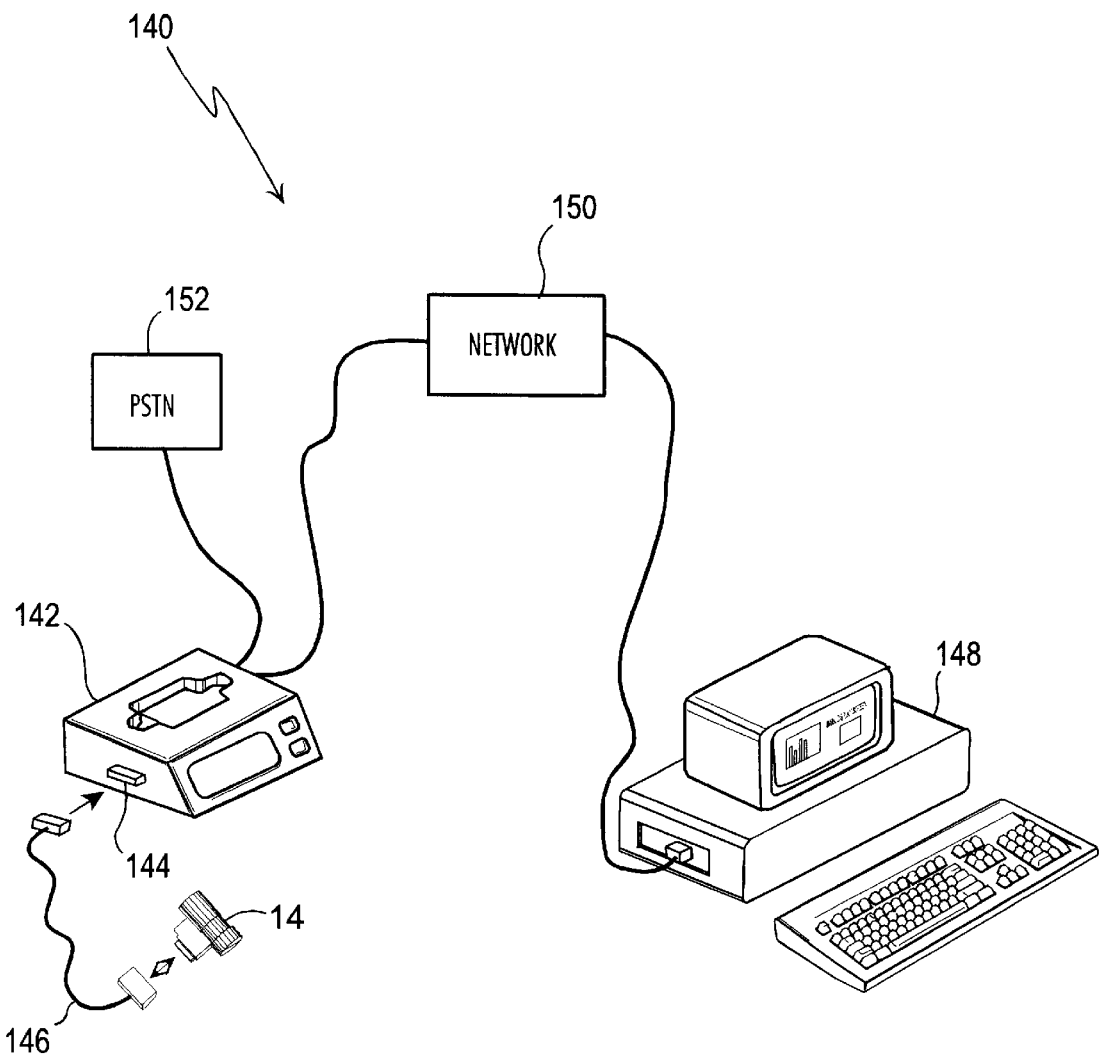

FIGS. 11–13 are timing diagrams illustrating various techniques for varying the gain of the intensifier in accordance with the present invention. In general, the techniques each tend to reduce the gain of the intensifier with time during the integration period while increasing well depth. As shown in the figures, the intensifier gain can be decreased in any of a number of different ways. For example, FIG. 11 shows a stepped decrease in gain during the integration period. FIG. 12 illustrates a piecewise linear approach. FIG. 13 illustrates a non-linear gain reduction method. Other gain reduction techniques are also possible. It should be appreciated that the change in gain does not have to be continuous or all in one direction during the integration period, but the overall trend should be a gain decrease during the integration period. Different methods for increasing the well depth (e.g., stepped, piece-wise linear, nonlinear) can also be used.

Figure 8:
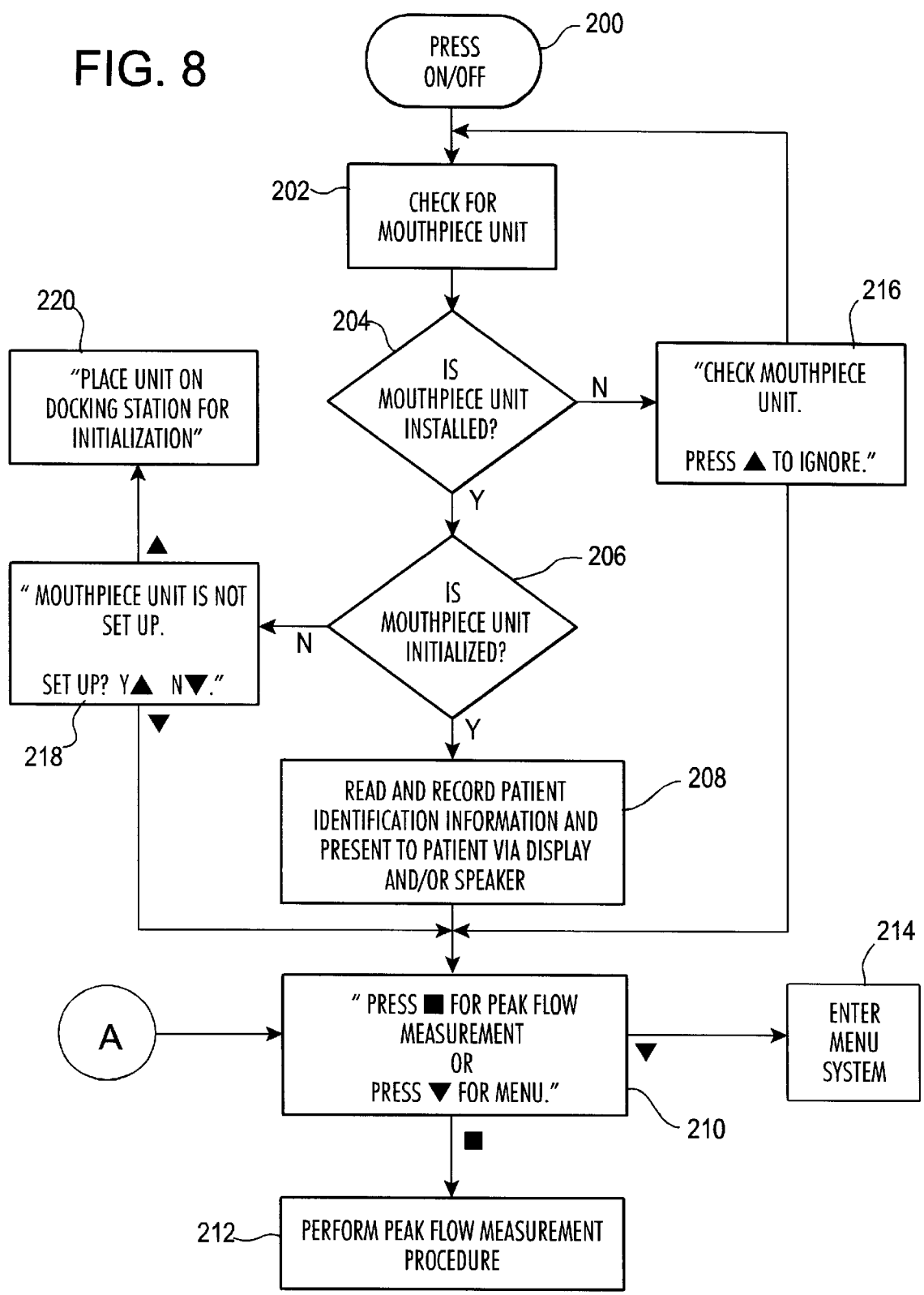

FIG. 8 is a block diagram illustrating an imaging system 70 in accordance with another embodiment of the present invention. The system 70 is similar to the system 60 of FIG. 7 except that the intensifier 14 has been replaced by a variable attenuator 74. To control the intensity of the input image during the integration period, the controller 62 varies the attenuation of the attenuator 74. In this regard, the variable attenuator 74 can include virtually any device that is capable of controllably reducing the intensity of an input image. For example, devices using liquid crystalline structures, adjustable mechanical irises, or polarizer structures can be used. Other structures are also possible.

FIGS. 14–16 are timing diagrams illustrating various techniques for changing the attenuation of the attenuator 74 in accordance with the present invention. As shown, the techniques each tend to increase the attenuation of the attenuator74 with time during the integration period. This increase in attenuation effectively decreases the intensity of the input image with time and can be stepped (FIG. 14), piecewise linear (FIG. 15), or non-linear (FIG. 16). Other attenuation increase techniques can also be used. It should be appreciated that the change in attenuation does not have to be continuous or all in one direction during the integration period, but the overall trend should be an attenuation increase during the integration period.

Figure 9:
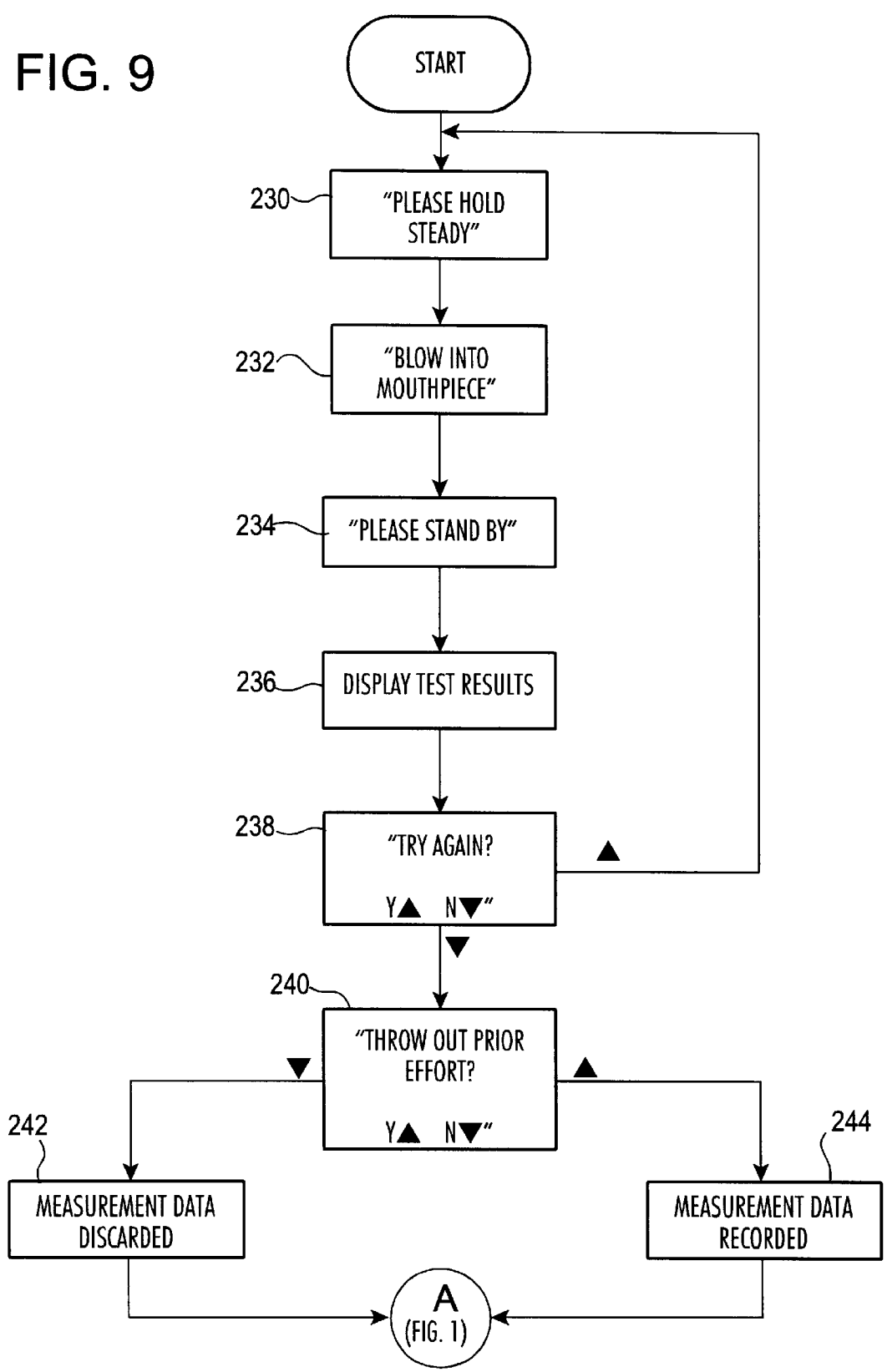

FIG. 9 is a block diagram illustrating an imaging system 80 in accordance with yet another embodiment of the present invention. Here, both an intensifier 14 and an attenuator 74 are provided. The controller 62 can control both the gain of the intensifier 14 and the attenuation of the attenuator 74 during the integration period to effectively process the input image. Using both units provides an added degree of control for achieving dynamic range enhancement. Significantly, the use of both an intensifier 14 and an attenuator 74 allows a full range of positive and negative intensity gains to be achieved prior to sensing. This added flexibility can increase the range of input images that can be effectively processed by the system 80. That is, some input scenes (e.g., low light scenes) may require more intensifier gain to be optimally processed and little attenuation. Others (e.g., daylight scenes) may require little intensifier gain and more attenuation to be optimally processed.

As mentioned above, a control loop can be used in accordance with the present invention so that adjustments to image intensity and/or well depth can be made based on the contents of the underlying image. In conceiving the present invention, it was appreciated that different control procedures would be optimal during the integration period for different image types. For example, a dimly lit scene having a few point sources of light would optimally require different intensity and/or well depth adjustments during the integration period than would a brightly lit daytime scene. In this regard, an optional control loop 64 is provided in the systems of FIGS. 7–9 to allow the control procedures used to conform to the content of the images presently being processed. In the illustrated embodiments, the control loop 64 monitors the output signal of the pre-amplifier 18. It should be appreciated that image monitoring can occur at virtually any location within the imager, including the output of the sensor 16 and locations between the image input device 12 and the sensor 16.

FIG. 10 is a block diagram illustrating functionality within a controller 62 for use in an embodiment of the invention employing a control loop 64. As illustrated, the controller 62 includes: an intensity control unit 82, a sensor well control unit 84, and a parameter extraction unit 86. During operation, the parameter extraction unit 86 receives an image signal (e.g., from the pre-amplifier 18 in the illustrated embodiment) and extracts parameters from the image signal that are descriptive of the content of the image. The content information is then delivered to the intensity control unit 82 and/or the sensor well control unit 84 for use in determining at least one optimal control procedure for use during the integration period. That is, either one of the control units, or both, can use the image content information to determine a corresponding control procedure.

Control procedures can be determined in any of a number of different manners. For example, a lookup table approach can be used where the appropriate control unit searches the table to determine the control procedure that should be used for a given scene content. In another embodiment, equations are used to determine the appropriate control procedures. In fact, any method of correlating the image content information to a known control procedure can be used in accordance with the present invention.

In the embodiment illustrated in FIG. 10, the parameter extraction unit 86 includes: a combiner 90, first and second comparators 92, 94, an average filter 96, and a peak detector 98. During operation, the average filter 96 and the peak detector 98 receive as input the output image signal from the pre-amplifier 18. The average filter 96 determines an average intensity of the scene and the peak detector 98 determines a peak intensity of the scene. The peak and average information is then transferred to respective comparators 92, 94 for comparison with corresponding reference values. The results of the comparisons are delivered to the combiner 90 which combines the signals in a predetermined fashion. In one embodiment, the combiner 90 comprises a summer for adding the comparison results together. The combined parameter signal is then delivered to the intensity control unit 82 and the sensor well control unit 84 for use in determining optimal control procedures. It should be appreciated that the parameter extraction unit 86 can be designed to extract virtually any parameter(s) from the monitored image that can aid in determining optimal control procedures. That is, the invention is not limited to use of average and peak intensities.

As shown in FIG. 10, the intensity control unit 82 is operatively coupled to the sensor well control unit 84, via connection 88, for allowing the two control units to interact so that well control and intensity control procedures complement one another. In one embodiment, the two control units 82, 84 act in unison so that the control procedures are determined concurrently. In another embodiment, one of the control units first determines its optimal control procedure based upon the image content and then the other control unit determines its control procedure based upon the control procedure of the first control unit. For example, based on the image parameters, the sensor well control unit 84 may determine that a particular well depth slope will be used to increase well depth during the integration period. Based on the selected slope and the image parameters, the intensity control unit 82 can then determine how it will change intensity during the integration period. In an alternate approach, one of the control units 82, 84 will always use the same control procedure during the integration period (e.g., a particular well depth slope in the sensor well control 84) and the other control unit will adapt its control procedure to the first one based on image content.

Some or all of the functions illustrated in FIG. 10 can be implemented in software within in a digital processing device. For example, the intensity control and well control functions can each be performed as part of a program within a processor. In addition, parameter extraction can also be performed in software. Virtually any type of processing device can be used to perform this function. For example, devices such as a general purpose microprocessors, digital signal processors, reduced instruction set computers, and/or complex instruction set computers can be used. Reconfigurable hardware devices, such as a field programmable gate arrays, can also be used. It should be appreciated that full hardware-based control solutions are also possible.

Referring back to FIG. 7, an intensity control procedure will now be described for use with an intensifier 14 having a gating feature. FIG. 17 is a timing diagram illustrating the procedure. Waveform 100 is the integration waveform for the system and has a positive pulse value during the integration period. Waveform 102 is the intensifier gating waveform and has a positive pulse value when the intensifier 14 is gated-on and a nominal value (e.g., zero volts) when the intensifier 14 if gated off. Waveform 104 is the sensor well capacity control signal. As shown, the well capacity in increased with time during the integration period, as described previously.

In accordance with the procedure, the controller 62 controls the intensity of the image 24 input into the sensor 16 by gating-off the intensifier 14 during (i.e., before the end of) the integration period. This gate-off point in illustrated in FIG. 17 as the falling edge of the positive pulse of waveform 102. When the intensifier 14 is gated off, the intensity of the signal reaching the sensor 16 drops off. Waveform 106 illustrates the anode phosphor luminance of the intensifier 14 during the process. Because of the luminous decay of the anode phosphor in the intensifier 14, the intensity does not drop-off immediately upon gating off the intensifier 14, but non-linearly decreases to a minimal value. In a preferred approach, as illustrated in FIG. 17, this non-linear drop-off is made to coincide with a non-linear increase in sensor well depth.

As with other control procedures discussed herein, the control procedure illustrated in FIG. 17 can be used in conjunction with a control loop to vary the time during the integration period at which the intensifier 14 is gated-off. In applications requiring greater fall-off in intensity (i.e., greater reduction in charge accumulation toward the end of the integration period), the gate-off will occur earlier in the integration period. In applications requiring less fall-off, the gate-off will occur later in the integration period. In addition, the sensor well capacity waveform 104 may be changed to correspond to the earlier or later gate-off. By effectively controlling the gate-off time, the dynamic range can be optimized based on the content of the image currently being processed.

Although the present invention has been described in conjunction with its preferred embodiments, it is to be understood that modifications and variations may be resorted to without departing from the spirit, and scope of the invention as those skilled in the art readily understand. Such modifications and variations are considered to be within the purview and scope of the invention and the appended claims.

What is claimed is:

1. An imaging system for responding to a range of image intensities, comprising:
   an image input for receiving an image from an exterior environment;
   an image sensor for sensing the image and for generating an electrical signal in response thereto, said image sensor including at least one charge well for collecting charge in response to the image during an integration period having a start and an end, said integration period being defined as including a first half and a second half with said first half beginning at said start of said integration period and said second half terminating at said end of said integration period, said at least one charge well having a variable well depth;

an intensity unit, located between said image input and said image sensor, for adjusting an image intensity of the image before the image reaches said image sensor; and a control subsystem, coupled to said image sensor and said intensity unit, that increases a high end intensity of said range of intensities by decreasing overall said image intensity during said integration period while increasing overall said well depth of said at least one charge well during said integration period wherein, in the event that said image intensity, during at least said first half of said integration period is substantially the same, said control subsystem includes at least a first controller that controls said well depth of said at least one charge well such that said well depth increases at least during some portion of said second half of said integration period and, in the event that said image intensity, during greater than three-quarters of said integration period is substantially the same, said control subsystem includes at least a first controller that controls said well depth of said at least one charge well such that said well depth increases at least during said second half of said integration period, and in the event that said image intensity, during at least a majority of said integration period decreases in a step-wise manner, said control subsystem includes at least a first controller that controls said well depth of said at least one charge well such that said well depth increases during at least said second half of said integration period and in which, under control of said control subsystem, said image intensity has at least a first magnitude that occurs closer to said start than to said end of said integration period and during at least some of said second half of said integration period, said image intensity has at least one decreased magnitude that is less than said first magnitude and at the same time said image intensity has said at least one decreased magnitude, said well depth of said at least one charge well increases from at least a first depth to at least a second depth.

2. An imaging system, as claimed in claim 1, wherein:

during said second half of said integration period, said image intensity has a plurality of decreased magnitudes, with each of said plurality of decreased magnitudes being less than said first magnitude and, at the same time said image intensity has said plurality of decreased magnitudes, said well depth of said at least one charge well increases from said first depth to said second depth.

3. An imaging system, as claimed in claim 1, wherein:

said control subsystem determines a desired control procedure for one of said image intensity and said well depth of said at least one charge well and uses said desired control procedure in determining the other of said image intensity and said well depth of said at least one charge well.

4. An imaging system, as claimed in claim 1, wherein:

said first controller includes at least one of an intensifier for controllably increasing said image intensity and a variable attenuator for controllably decreasing said image intensity.

5. An imaging system, as claimed in claim 1, wherein:

said control subsystem includes a second controller that controls said image intensity.

6. An imaging system, as claimed in claim 1, wherein:

said control subsystem includes at least one of said first controller and a second controller that controls said image intensity, during at least said first half of said integration period, by one of the following: maintaining said image intensity substantially the same and varying said image intensity in a step-wise manner from said start of said integration period.

7. An imaging system, as claimed in claim 1, wherein:

said image intensity remains greater than zero for substantially all of said integration period and then said image intensity is gated off.

8. An imaging system, as claimed in claim 1, wherein:

said control subsystem includes a parameter extraction unit for extracting at least one intensity parameter from another image being processed by said imaging system and also including a memory for storing predetermined information related to said at least one intensity parameter, wherein said control subsystem compares said at least one intensity parameter with said predetermined information to determine an output and uses said output to control said image intensity of the image.

* * * * *

UNITED STATES PATENT AND TRADEMARK OFFICE
CERTIFICATE OF CORRECTION

PATENT NO.   : 6,188,433 B1
DATED        : February 13, 2001
INVENTOR(S)  : Jeffrey D. Orbock It is certified that error appears in the above-identified patent and that said Letters Patent is hereby corrected as shown below:

Title page,
Fig. 1 is deleted and replaced by the following:

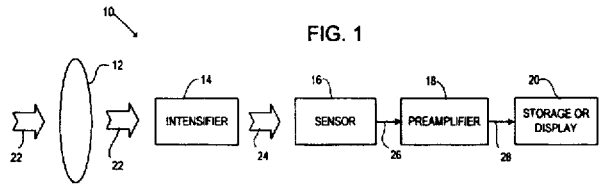

In the Drawings,
Fig. 1 is deleted and replaced by the following:

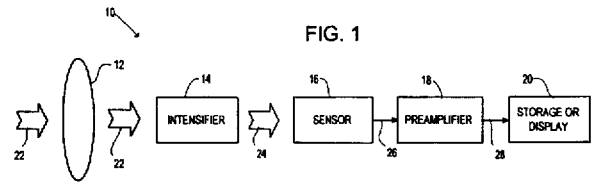

Fig. 2 is deleted and replaced by the following:

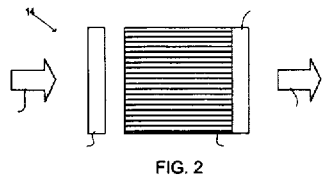

FIG. 2

UNITED STATES PATENT AND TRADEMARK OFFICE
CERTIFICATE OF CORRECTION

PATENT NO. : 6,188,433 B1
DATED : February 13, 2001
INVENTOR(S) : Jeffrey D. Orbock Page 2 of 6

It is certified that error appears in the above-identified patent and that said Letters Patent is hereby corrected as shown below:

Figs. 3 and 4 are deleted and replaced by the following:

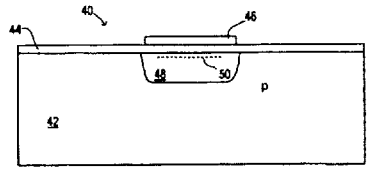

FIG. 3

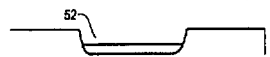

FIG. 4

Figs. 5 and 6 are deleted and replaced by the following:

FIG. 5

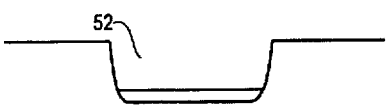

FIG. 6

UNITED STATES PATENT AND TRADEMARK OFFICE
CERTIFICATE OF CORRECTION

PATENT NO. : 6,188,433 B1
DATED : February 13, 2001
INVENTOR(S) : Jeffrey D. Orbock Page 3 of 6

It is certified that error appears in the above-identified patent and that said Letters Patent is hereby corrected as shown below:

Fig. 7 is deleted and replaced by the following:

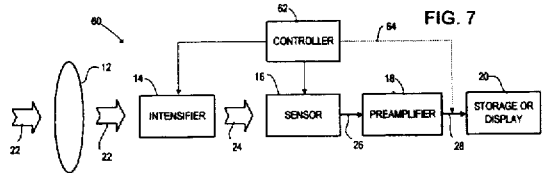

Fig. 8 is deleted and replaced by the following:

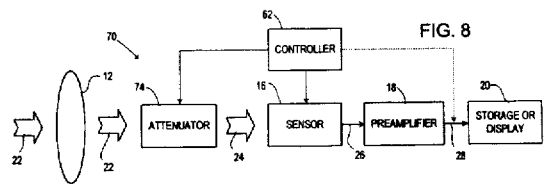

Fig. 9 is deleted and replaced by the following:

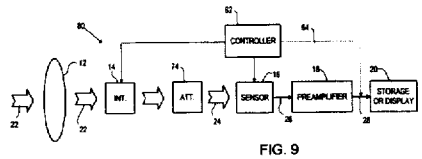

Figure 10A:
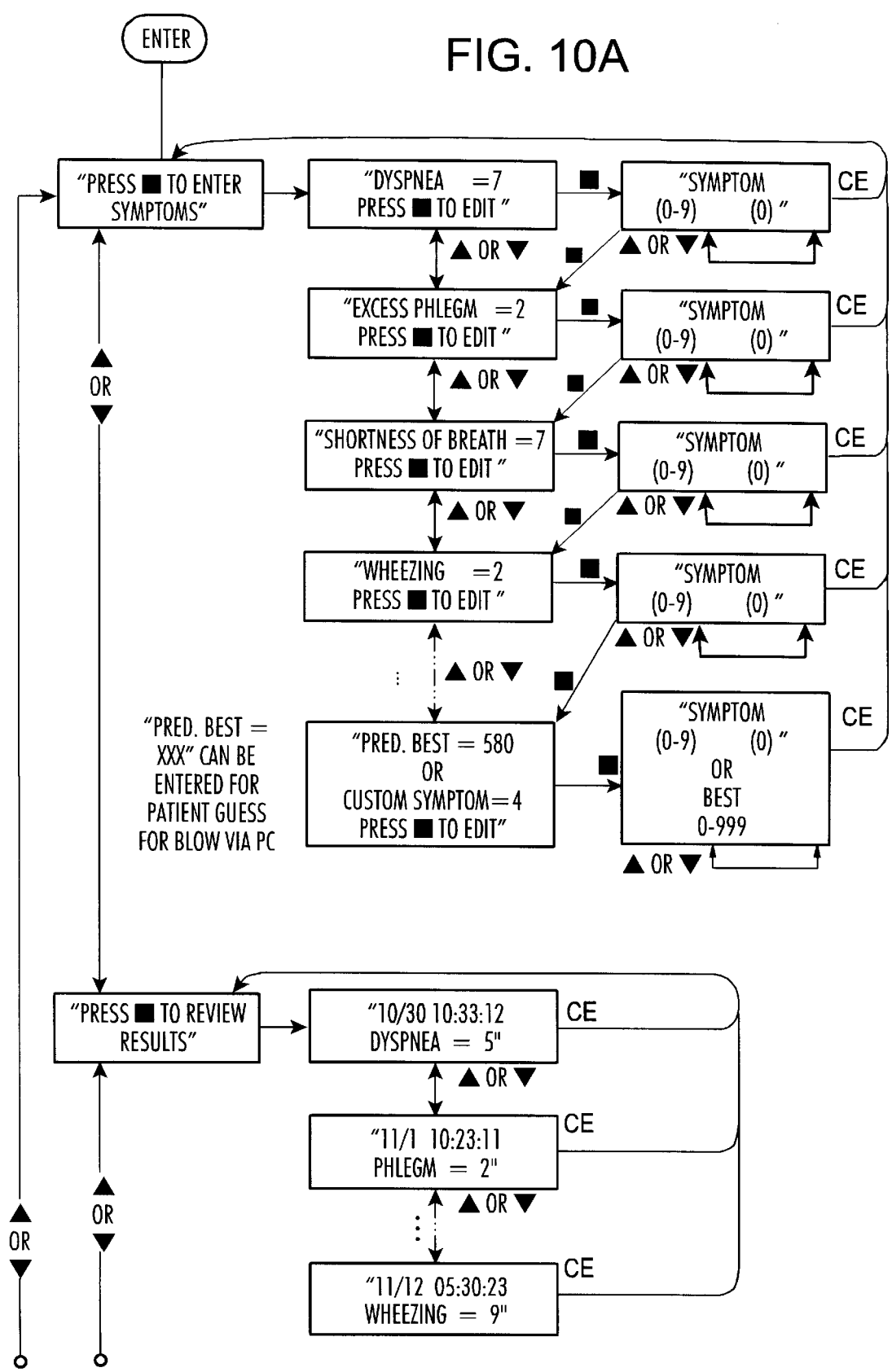
FIG. 10 is a block diagram illustrating a controller in accordance with one embodiment of the present invention.

Figs. 10A and 10B are deleted and replaced by the following:

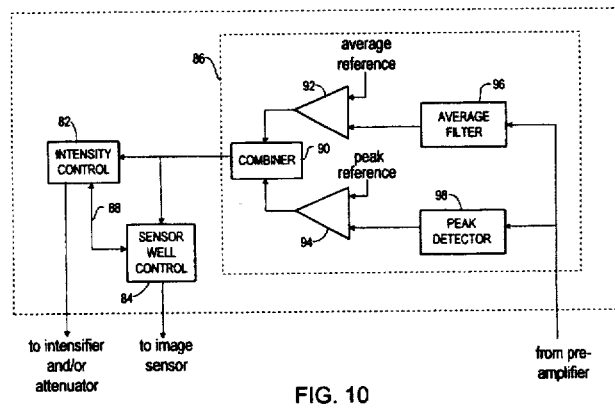

UNITED STATES PATENT AND TRADEMARK OFFICE
CERTIFICATE OF CORRECTION

PATENT NO. : 6,188,433 B1
DATED : February 13, 2001
INVENTOR(S) : Jeffrey D. Orbock It is certified that error appears in the above-identified patent and that said Letters Patent is hereby corrected as shown below:

Fig. 11 is deleted and replaced by the following:

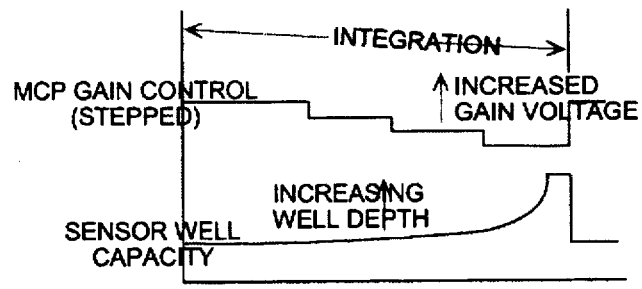

FIG. 11

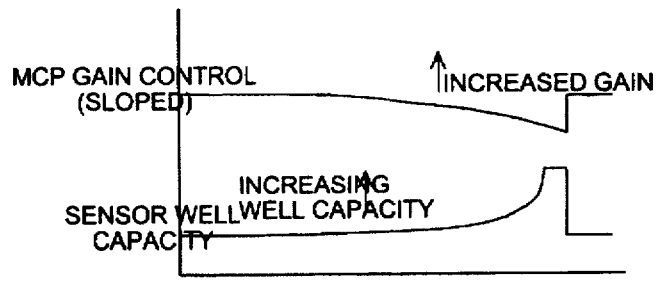

FIG. 12

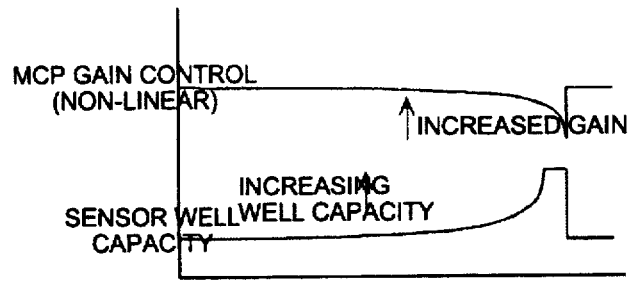

FIG. 13

UNITED STATES PATENT AND TRADEMARK OFFICE
CERTIFICATE OF CORRECTION

PATENT NO. : 6,188,433 B1
DATED : February 13, 2001
INVENTOR(S) : Jeffrey D. Orbock It is certified that error appears in the above-identified patent and that said Letters Patent is hereby corrected as shown below:

The following figures are added:

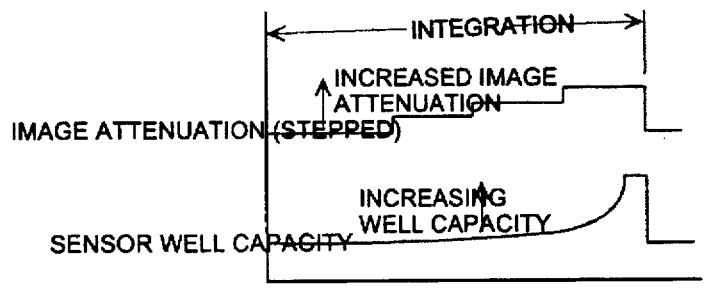

FIG. 14

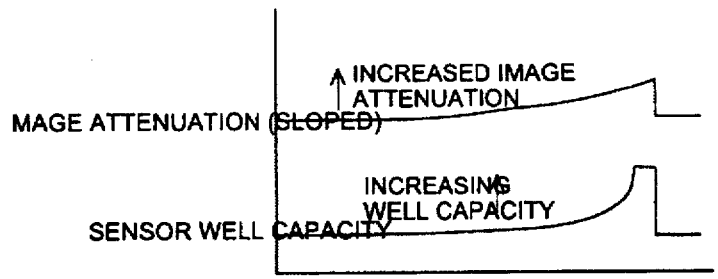

FIG. 15

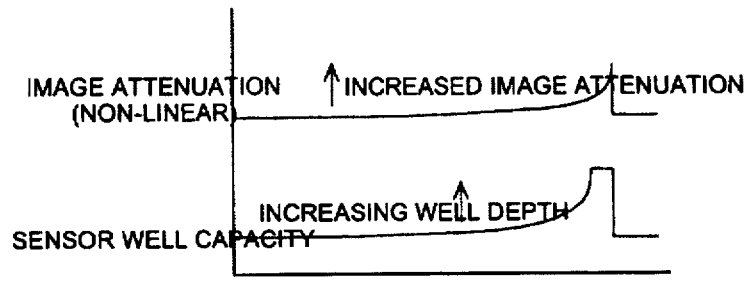

FIG. 16

UNITED STATES PATENT AND TRADEMARK OFFICE
CERTIFICATE OF CORRECTION

PATENT NO. : 6,188,433 B1
DATED : February 13, 2001
INVENTOR(S) : Jeffrey D. Orbock It is certified that error appears in the above-identified patent and that said Letters Patent is hereby corrected as shown below:

The following figure is added:

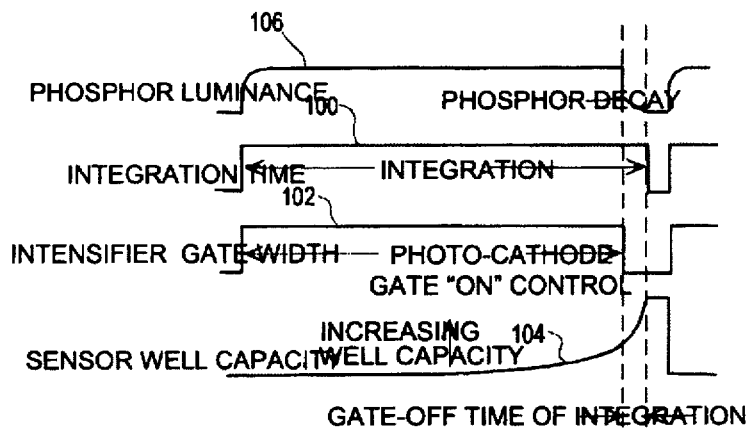

FIG. 17

Signed and Sealed this

Sixteenth Day of October, 2001

Attest:

Attesting Officer

NICHOLAS P. GODICI
Acting Director of the United States Patent and Trademark Office